United States Patent Office 3,655,605
Patented Apr. 11, 1972

3,655,605
SURGICAL CEMENTS FROM ZINC OXIDE AND AQUEOUS POLY(ACRYLIC ACID)
Dennis Clifford Smith, Cheadle Hulme, England, assignor to National Research Development Corporation, London, England
No Drawing. Continuation-in-part of application Ser. No. 692,711, Dec. 22, 1967. This application June 26, 1969, Ser. No. 836,991
Claims priority, application Great Britain, Dec. 30, 1966, 58,472/66
Int. Cl. C08f 29/34; A61k 5/00
U.S. Cl. 260—29.6 M    22 Claims

ABSTRACT OF THE DISCLOSURE

Dental cements are prepared by mixing a surgical grade zinc oxide powder with an aqueous solution of polyacrylic acid to give a plastic mass that rapidly hardens. Typical solutions contain about 42% by weight polyacrylic acid having a viscosity determined molecular weight of about 25,000 or about 55,000 to 80,000. The cements have greater adhesion and cause less irritation than conventional zinc phosphate cements.

---

This application is a continuation-in-part of my earlier filed application Ser. No. 692,711, filed Dec. 22, 1967 and now abandoned, entitled "Improvements Relating to Surgical Cements."

This invention relates to surgical cements and is particularly concerned with the provision of an improved dental cement.

The materials known as dental cements have many applications in dentistry including cementing restorations into place in the tooth, providing a base and/or lining in a tooth cavity, providing a temporary fixing for the bands of orthodontic appliances to the teeth and sealing root-canals after endodontic treatment. At the moment, zinc phosphate cements are widely used for this purpose. These cements are obtained by mixing together a zinc oxide powder and a buffered ortho-phosphoric acid solution immediately prior to use. The ease of mixing and setting time of the cement are influenced by the relative proportions and reactivities of the components. Such zinc phosphate cements are not entirely satisfactory because the cement is highly acidic in nature (pH 1–2) and can cause pulpal injury if it is placed directly on freshly cut dentine. Furthermore, the cementing action of such materials is purely mechanical and there is little actual adhesion between the set zinc phosphate cement and the tooth substance.

The present invention broadly provides an improved cement for dental and other surgical purposes prepared by mixing a surgical grade of metal oxide powder with an aqueous solution of a polyacrylic acid. This new cement retains the strength of the zinc phosphate cements but has the advantage that it is much less irritant in nature and hence less painful to the patient and furthermore, exhibits a greater degree of adhesion to the tooth or other calcareous substances. This improved adhesion is believed to be the result of chelation between the poly acid in the cement and the calcium.

The present invention provides a surgical cement pack comprising a surgically acceptable grade of metal oxide powder, and an aqueous solution containing at least 20% by weight and preferably 40 to 60% by weight of a polyacrylic acid having a viscosity determined average molecular weight of 5,000 to 250,000, the two components upon being mixed together in a ratio between 0.5:1 to 4:1 on a weight basis forming a plastic mass which rapidly hardens as a surgical cement but which remains plastic long enough to be formed into a desired shape. The cement usually remains workable for up to about 8 minutes after which time it hardens rapidly in the shape into which it has been set.

The metal oxide powder may be similar to that used in the production of the conventional cements but is preferably further de-activated by heating. Setting time appears to be proportional to particle size and reactivity and can be prolonged by heating the powder particles; for example a typical de-activating heat treatment of an Analar zinc oxide involves heating powder at about 1000° C. for up to about 40 hours. The conventional zinc oxide powder to be de-activated need not be 100% zinc oxide but may be mixed with a proportion of other metal salts or oxides to improve the surgical properties of the final cement product. These additives are already incorporated in the powders used for the production of conventional zinc oxide/phosphoric acid based cements. The predominant component is always zinc oxide but magnesium oxide, bismuth oxide, calcium phosphate and/or calcium fluoride may also be added. The term "surgical grade zinc oxide powder" includes zinc oxide containing such conventional additives. Other metal oxides which may be used include the oxides of cadmium, mercury, calcium, copper, strontium, barium and silver.

The polyacrylic acid should have a viscosity determined average molecular weight in the range of 5,000 to 250,000, and preferably from 15,000 to 150,000, i.e. the polymer should be readily water-soluble. Ease of handling is related to the vicosity of the aqueous solution and if it is too viscous "cobwebbing" becomes a problem when the desired quantity of solution is removed from the container and mixed with the metal oxide powder. Solutions of polymers with molecular weights well in excess of 150,000 can be obtained with acceptable viscosities but it is found that for some purposes the concentration of the acid in such solutions is too low so that the final cement product does not have sufficient mechanical strength.

Accordingly, the solution of polyacrylic acid used in this dental application should preferably be of a high concentration and the present invention includes a solution containing at least 40% w./w. and preferably 50 to 60% w./w. of a polyacrylic acid having a viscosity determined average molecular weight of 15,000 to 150,000 and which can be used in the manner described to obtain a surgical cement. Results obtained so far suggest that the optimum molecular weight of a polymer should be at least about 25,000 and preferably of the order of 50,000 for maximum mechanical strength. Very good results are obtained with a solution of about 42% concentration and a molecular weight of about 25,000 or about 55,000 to 80,000 according to clinical application.

Polymers having molecular weights of from 5,000 to 15,000 and from 150,000 to 250,000 can be used in concentrations of from 20 to 60% by weight in applications where maximum strength is not required or not desirable, for example periodontal packs or temporary fillings and cementation. Polymers having molecular weights of from 15,000 to 150,000 and concentrations in the range 20 to 40% by weight may also be useful for these applications.

The polyacrylate cements are designed to be made by the practitioner immediately prior to use as are the zinc phosphate dental cements and the materials in the pack may be brought together, mixed and formed into the required shape immediately prior to use. The mixed components form a plastic mass which can be cast, moulded, blown or otherwise formed into the required shape during the brief period that the mixture retains its plastic properties. It is preferred to use these cements in contact with calcareous materials as particularly strong adhesion occurs to such materials, apparently through the formation of chemical bonds.

A quantity of polyacrylic solution sufficient to make up one mix of cement may be easily withdrawn from its container using a glass rod or similar instrument or extruded from a tube or like container and this may be mixed with a quantity of the oxide powder on a suitable surface. The components mix quite rapidly to give a homogeneous mass which commences to harden within a few minutes and is usually completely hard within about eight minutes of mixing. In addition to the other parameters mentioned above, the rate of hardening, strength of final product, etc., are determined by the powder/liquid ratio and ideally this should be about 0.5:1 to 4:1 on a weight basis. Too little or too much powder normally results in a mixture that is difficult to form into the desired shape but it is not essential to prepare the cement using a ratio within these limits. Careful matching of the powder and liquid components will enable an acceptable plastic mass to be obtained which will harden in an acceptable time. Typical powder/liquid ratios that have given rise to valuable cement products are 1:1, 1.5:1, 2:1 and 3.25:1 and the optimum ratio for a particular powder and liquid may be determined by a few simple preliminary experiments which will normally indicate a figure in the range 1.5:1 to 3.5:1. Alternatively, the pack may contain a mixture of the components in the required ratio, provided that one or both of the components are encapsulated to prevent premature reaction.

The polyacrylic acid solution may be prepared by any of the customarily used polymerisation techniques in aqueous solution for example polymerisation may be carried out in the presence of ammonium persulphate, and various chain transfer reagents to give solutions containing up to about 30% of the polymer. This solution may then be concentrated, if necessary, to give more viscous solutions containing more than 40% of the polymer which are used in the preparation of the preferred dental cements. Use of weaker solutions of polymers often leads to the production of a product with lower mechanical strength.

A modified polymerisation technique has been developed which is believed to give rise to a polymer having a narrower molecular weight range than those obtained by the more conventional techniques. These narrow molecular weight range polymers give rise to particularly good cements and may be prepared by adding an aqueous solution of acrylic acid and an aqueous solution of ammonium persulphate, preferably slowly and continuously, to an aqueous solution of ammonium persulphate. Various other monomers may be included in the polymerising system to give acrylic acid copolymers having modified properties, provided that the acrylic acid copolymer is soluble in water and reacts with a metal oxide in the required manner.

The following examples are given to illustrate the invention. Temperatures are in ° C., quantities in parts by weight.

EXAMPLE 1

(A) Preparation of zinc oxide (a) Analar grade zinc oxide is heated in an electric furnace at 900–1000° C. for 12–24 hours until the desired degree of reactivity in setting with one of the polyacrylic acids below has been achieved. The reactivity is measured by a setting time determination at 37° C. in 100% R.H. (relative humidity) in a similar manner to the test described in B.S. 3364 (Dental Zinc Phosphate Cement).

(b) Zinc carbonate is heated for 30 minutes at a temperature between 350–600° C. The resulting zinc oxide is deactivated by heating at 900–1000° C. as in (a) above.

(c) A mixture of 90 parts Analar grade zinc oxide to 10 parts by weight of Analar grade magnesium oxide is heated at 1000–1300° C. for 8–12 hours. The resulting cake is ball milled and passed through a 300 mesh sieve. The powder is then heated at 800–1000° C. for 8–12 hours until the desired degree of reactivity is obtained as in (a) above.

The oxides produced by the methods of (a) and (b) are yellow and can be used directly without coloring. The oxide from (c) is nearly white and may be colored to dentine shades by the addition of pigments in the usual way.

(B) Preparation of polyacrylic acid

A four necked round bottomed flask is fitted with a reflux condenser, gas inlet, dropping funnel and a stirrer. The following charge is placed in the flask and de-gassed with nitrogen:

Distilled water _____ 90
Ammonium persulphate _____ 0.9

The solution is heated to 80–85° C. and 30 parts of redistilled inhibitor-free acrylic acid added over 4–5 hours. After the addition is complete the mixture is heated for a further hour at 100–110° C. The solution is then subjected to vacuum distillation to remove excess water until the polyacrylic acid concentration is about 41 percent as determined by potentiometric titration. The molecular weight of the polyacrylic acid determined by viscosity measurement is approximately 80,000.

(C) Preparation of the polyacrylate cement

The zinc oxide prepared as in Example 1A(a) is spatulated on a glass slab in the usual dental manner with the polyacrylic acid solution prepared as above in the ratio of 3.25:1. A plastic mix results which sets to a hard strong mass (Table 1) which is suitable as a cavity liner, a cement base for other restorative materials, or as a temporary filling material.

EXAMPLE 2

A polyacrylic acid solution, prepared as described in Example 1B but of 50–55 percent concentration, is used to form a cement with a powder:liquid ratio of 2:1 as otherwise described in Example 1C. This stronger cement (Table 1) can be used for the purposes mentioned in Example 1 but also for the cementation of orthodontic bands and attachments to the teeth.

EXAMPLE 3

The polyacrylic acid solution of Example 2 is used to form a cement with the zinc oxide described in Example 1A(c) in the powder: liquid ratio of 1.5:1. The mix is suitable for the cementation of gold inlays, crowns and bridges and porcelain jacket crowns.

EXAMPLE 4

A polyacrylic acid solution is prepared according to the method of Example 1B but with the following charge in the flask:

Distilled water _____ 100
Isopropanol _____ 100
Ammonium persulphate _____ 10

Re-distilled inhibitor-free acrylic acid, 100 parts, is added over 5–6 hours the solution being maintained at 80–85° C. The solution is heated for a further hour at 100–110° C. and then concentrated by vacuum distillation to give a polyacrylic acid, concentration 42% and viscosity determined molecular weight approximately 26,000. This liquid is mixed as before with the zinc oxide of Example 1A(c) in a powder liquid ratio of 2.5:1. This cement which gives a more fluid mix is suitable for the purposes mentioned in Example 3.

EXAMPLE 5

A polyacrylic acid solution prepared according to the conditions of Example 4 but of 60% concentration is mixed with the zinc oxide of Example 1A(a) in a powder liquid ratio of 1:1. This cement can be employed for the purposes mentioned in Example 1.

EXAMPLE 6

A zinc oxide prepared according to Example 1A(c) is blended in a rotary mixer with an equal part of a silicate glass containing leachable fluoride. The resulting powder is mixed with a 41% polyacrylic acid liquid (viscosity determined molecular weight approximately 80,000) prepared in a similar manner to Example 1B in a powder:liquid ratio of 3.25:1. The mix is suitable for the cementation of orthodontic bands as a temporary filling, or for the filling of occlusal fissures as a caries preventive measure.

EXAMPLE 7

A polyacrylic acid solution is prepared as described in Example 1B but with the following quantities:

Distilled water _____ 90
Ammonium persulphate _____ 0.6
Isopropanol _____ 6

This solution is maintained at 80–85° C. and 30 parts of acrylic acids added over 4 hours. The solution is concentrated to 50% polyacrylic acid having a viscosity determined molecular weight approximately 150,000.

This liquid is mixed with a zinc oxide prepared as described in Example 1A(c) in a powder liquid ratio of 2:1. The resulting mix is suitable for the purposes mentioned in Example 1 and may also be used as the basis for a periodontal pack.

EXAMPLE 8

A zinc oxide prepared as described in Example 1(c) is blended with about 50 parts of a powdered glass containing a high proportion of zinc ions. The resulting mixture is used to form a cement with a polyacrylic acid prepared as described in Example 7 but is used in 43% concentration and in a powder:liquid ratio of 2:1. The product which is of improved translucence may be used for the purposes mentioned in Example 3.

The setting times and strengths of the cements described in these examples are given in Table I below.

TABLE I

| Cement Example | Setting time, min. (37° C., 100% R.H.) | Compressive strength (p.s.i.) | |
|---|---|---|---|
| | | 24 hrs. | 7 days |
| 1 | 4 | 12,500 | |
| 2 | 3 | 18,400 | 20,000 |
| 3 | 4 | 15,300 | |
| 4 | 3 | 9,400 | |
| 5 | 3 | 9,700 | |
| 6 | 5 | 13,900 | |
| 7 | 4 | 18,500 | |
| 8 | 6 | 11,600 | 15,000 |

EXAMPLE 9

Powder (A) A mixture of 90 parts of Analar grade zinc oxide and 10 parts of Analar grade magnesium oxide is heated at 1000° C. for 12 hours. The resulting cake is broken up and milled and passed through a 300 mesh sieve and then heated at 1000° C. for 24 hours.

(B) The powder obtained as in A is blended with 30 percent by weight of calcium phosphate, $Ca_3(PO_4)_2$.

Polyacrylic acid solution A

A wide-necked flat-flange-type round-bottomed flask with a 5 socket flat-flange adaptor is fitted with a thermometer, a reflux condenser, gas inlet, liquid inlet and stirrer. The following charge is placed in the flask and degassed with nitrogen:

Parts

Distilled water _____ 200
Ammonium persulphate (the ammonium persulphate is assayed before use) _____ 2.5
Solution A:
    Redistilled inhibitor-free acrylic acid _____ 100
    Distilled water _____ 100
    Isopropanol _____ 20
Solution B:
    Distilled water _____ 60
    Ammonium persulphate _____ 2.5

The flask charge is heated to 80–85° C. while continuing nitrogen purging. Solutions A and B are then added over 2 hours in the ratio of 3.4:1. Continuous addition is desirable but in the absence of metering pumps a satisfactory result has been obtained by adding 10 parts by volume of A to 2.94 parts by volume of B every 5 minutes. The product is then maintained at 80–85° C. for a further two hours.

The solution is vacuum distilled at approximately 20 mm. of mercury (liquid and vapour temperature 80–85° C.) to give a polyacid concentration of 42%.

The polyacid concentration is determined accurately by dissolving an approximately 1.5 g. sample in 50 ml. distilled water and titrating with standardised N sodium hydroxide solutions. A potentiometric method is preferable but phenolphthalein can be used indicator if care is taken near the end point.

The molecular weight which should be about 20,000 is determined by the method of Sakamoto (Chem. Abstr., 58, 13160c). Solutions of the polyacrylic acid of concentrations of 1 g. of polyacrylic acid/100 ml. of 2 N sodium hydroxide and below are made and the viscosities measured using a Size A (1–5 centistokes) Ostwald type viscometer at 25.0=0.1° C. The specific viscosity is determined graphically in the usual way and the molecular weight calculated from the following equation:

$$(\eta) = 1.05 \times 10^{-3} M.W.^{0.54}$$

Polyacrylic acid solution B

The methods of preparation, assay and molecular weight determination are the same as for the Solution A. The reactants are as follows in this case:

Flask Charge: Parts
    Distilled water _____ 200
    Ammonium persulphate _____ 0.5
Solution A:
    Redistilled acrylic acid _____ 100
    Distilled water _____ 100
    Isopropanol _____ 20
Solution B:
    Distilled water _____ 60
    Ammonium persulphate _____ 0.5

The solution is concentrated to approximately 42% polyacrylic acid as before. The molecular weight is about 55,000.

Powder B is slower setting and gives improved strengths compared with Powder A when used with both polyacrylate liquids. Present experience suggests that Powder B is preferred for cementing complex restorations such as bridges, for placing multiple cavity linings and for other situations where more working time is required.

Solution A may be used particularly for cementing restorations while Solution B is more suitable for the production of cavity linings.

The powders and solutions may be mixed together preferably in a ratio of about 1.5:1 to 3.5:1 on a weight basis.

EXAMPLE 10

A polyacrylic acid solution is prepared as in Example 9, Solution A, but with no ammonium persulphate in the flask charge and the temperature at about 70° C. The resulting material which has a viscosity determined average molecular weight of approximately 170,000 is concentrated to 45% by weight. On mixing with magnesium oxide it forms a slow setting plastic mass suitable for use as a periodontal pack.

EXAMPLE 11

A polyacrylic acid solution is prepared in a similar manner as in Example 9A but using approximately 10 parts by weight of ammonium persulphate to yield a material with a molecular weight of approximately 5000. The resulting very fluid solution can be used at concentrations of 40 to 55% by weight with the various metal oxides at powder liquid ratios in the range described to give products of generally lower strength than those given in Table I. Such materials are usable for various dental applications where maximum strength is not desired such as temporary fillings or cementation.

EXAMPLE 12

A polymeric acid solution prepared in a similar manner to Example 9B can be used directly at about 30% by weight concentration to give products with compressive strengths in the region 8000 to 10,000 p.s.i. after a setting time of 24 hours (in comparison to Table I) which are suitable for the purposes mentioned in Example 1.

Polyacrylic acid solutions prepared in a similar manner to Examples 9A and 9B may be used in any concentration in the range 20 to 40% by weight with zinc oxides prepared as in Example 1(A), (B) or (C) (but with the quantity of magnesium oxide 0–10 parts by weight in (C)) provided that the metal oxide reactivity is adjusted to give a clinically acceptable setting time.

These examples are not to be taken as limiting the dental application of the invention. For example, the addition of fluorides, bacteriostatic agents and antibiotics in minor amounts may be made to the cement powder as is done with the present dental cements to provide some antibacterial or anticariogenic action. Cotton or asbestos fibres or the like may be added for greater convenience in manipulation of dressings or packs. The use of the surgical cement of the invention is not limited to dentistry and could find application in other forms of surgery, particularly orthopaedic surgery, where it could be used to assist in the resetting of fractured bone material. Many other variations will be evident to those experienced in the formation, manipulation and clinical uses of surgical cements which can be achieved for particular purposes without affecting the essential nature of the present invention.

I claim:

1. A process for the preparation of a surgical cement which comprises forming a mixture consisting essentially of a surgically acceptable grade of metal oxide powder and an aqueous solution containing at least 40% by weight of polyacrylic acid having a viscosity determined average molecular weight of 15,000–150,000 to give a mass that remains plastic long enough to be formed into a desired shape prior to hardening as a surgical cement.

2. A process according to claim 1, in which the powder and the solution are mixed together in a ratio of between 0.5:1 and 4:1 by weight.

3. A process according to claim 1, in which the powder has been deactivated by heat treatment.

4. A process according to claim 1, in which the powder is a mixture consisting predominantly of zinc oxide or zinc oxide together with at least one additive selected from the group consisting of magnesium oxide, bismuth oxide, calcium phosphate and calcium fluoride.

5. A process according to claim 1, in which the aqueous solution contains 50–60% by weight of polyacrylic acid having a molecular weight at least 25,000.

6. A process according to claim 1, in which the aqueous solution contains about 42% by weight of polyacrylic acid having a viscosity determined average molecular weight of about 25,000.

7. A process according to claim 1, in which the aqueous solution contains about 42% by weight of polyacrylic acid having a viscosity determined average molecular weight of about 55,000–80,000.

8. A process according to claim 1, in which the powder consists essentially of about 90% by weight zinc oxide and about 10% by weight magnesium oxide and has been deactivated by heating at about 1000° C., the solution is about a 42% solution of polyacrylic acid having a viscosity determined molecular weight of about 20,000 or about 55,000 and the powder and liquid are mixed together in a ratio of between 1.5:1 and 3.5:1.

9. A process according to claim 1, in which the powder consists essentially of a mixture containing about 90% by weight zinc oxide and about 10% by weight magnesium oxide which has been blended with about 30% by weight calcium phosphate and deactivated by heating at about 1000° C., the solution is about a 42% solution of a polyacrylic acid having a viscosity determined molecular weight of about 20,000 or about 55,000 and the powder and liquid are mixed together in a ratio of between 1.5:1 and 3.5:1.

10. A process for the preparation of a surgical cement which comprises forming a mixture consisting essentially of a surgically acceptable grade of metal oxide powder and an aqueous solution containing from 20 to 60% by weight of a polyacrylic acid having a viscosity determined average molecular weight of 5,000 to 15,000 or 150,000 to 250,000 or from 20 to 40% by weight of a polyacrylic acid having a viscosity determined average molecular weight of 15,000 to 150,000 in a powder to liquid ratio of between 0.5:1 and 4:1 by weight to give a mass that remains plastic long enough to be formed into a desired shape prior to hardening as a surgical cement.

11. A process for the preparation of a surgical cement which comprises forming a mixture consisting essentially of a surgically acceptable grade of metal oxide powder and an aqueous solution containing from about 20% to about 60% by weight of polyacrylic acid having a viscosity determined average molecular weight of from about 5,000 to about 250,000 to give a mass that remains plastic long enough to be formed into a desired shape prior to hardening as a surgical cement.

12. A process according to claim 11, in which the powder and the solution are mixed together in a ratio of between 0.5:1 and 4:1 by weight.

13. A surgical cement consisting essentially of a surgical grade metal oxide powder in combination with an aqueous solution containing from about 20% to about 60% of polyacrylic acid having a viscosity determined average molecular weight of from about 5,000 to about 250,000.

14. A surgical cement pack consisting essentially of a surgical grade metal oxide powder, a polyacrylic acid having a viscosity determined average molecular weight of from about 5,000 to about 250,000 and water; the pack having means to prevent premature reaction between the powder, polyacrcylic acid and water; said pack containing from about 0.5 to about 4 parts by weight of powder per part by weight of the total weight of the polyacrylic acid and water and the amount of the polyacrylic acid being at least about 20% by weight of the total weight of the polyacrylic acid and water, whereby when the powder, polyacrylic acid and water in the pack are mixed together a plastic mass is formed which rapidly hardens as a surgical cement but which remains plastic long enough to be formed into a desired shape.

15. The surgical cement pack according to claim 14, in which the polyacrylic acid has a viscosity determined average molecular weight of from about 15,000 to about 150,000, and the amount of the polyacrylic acid is at least about 40% by weight of the total weight of the polyacrylic acid and water.

16. The surgical cement pack according to claim 14, in which the powder has been deactivated by heat treatment.

17. The surgical cement pack according to claim 15, in which the powder is a mixture consisting predominantly of zinc oxide or zinc oxide together with at least one additive selected from magnesium oxide, bismuth oxide, calcium phosphate and calcium fluoride.

18. The surgical cement pack according to claim 15, in which the polyacrylic acid has a molecular weight of at least about 25,000, and the amount of the polyacrylic acid is about 50–60% by weight of the total weight of the polyacrylic acid and water.

19. The surgical cement pack according to claim 15, in which the polyacrylic acid has a viscosity determined average molecular weight of about 25,000 and the amount of the polyacrylic acid is about 42% by weight of the total weight of the polyacrylic acid and water.

20. The surgical cement pack according to claim 15, in which the polyacrylic acid has a viscosity determined average molecular weight of about 55,000–80,000 and the amount of the polyacrylic acid is about 42% by weight of the total weight of the polyacrylic acid and water.

21. A surgical cement pack according to claim 15, in which the power consists essentially of a mixture containing about 90% by weight zinc oxide and 10% by weight magnesium oxide or a mixture containing 90% by weight zinc oxide and 10% by weight magnesium oxide which has been blended with 30% by weight calcium phosphate; said mixture or blend having been deactivated by heating to about 1000° C.

22. A surgical cement pack according to claim 15, in which the polyacrylic acid has a viscosity determined molecular weight of about 20,000 or about 55,000 and the amount of the polyacrylic acid is about 42% by weight of the total weight of the polyacrylic acid and water.

References Cited

UNITED STATES PATENTS

| | | | |
|---|---|---|---|
| 1,977,580 | 10/1934 | Grier | 206—46 |
| 2,760,431 | 8/1956 | Beatty | 101—149.2 |
| 2,794,016 | 5/1957 | Glenn et al. | 260—80.5 |
| 3,336,669 | 8/1967 | Kramer | 32—15 |
| 3,462,839 | 8/1969 | Boyer et al. | 32—15 |

FOREIGN PATENTS

| | | |
|---|---|---|
| 1,001,374 | 8/1965 | Great Britain. |
| 1,049,036 | 11/1966 | Great Britain. |
| 966,278 | 7/1957 | Germany. |

MELVIN GOLDSTEIN, Primary Examiner

U.S. Cl. X.R.

32—15; 106—35; 260—41 B